June 20, 1967     D. T. BEST     3,327,129
PARAMETRICALLY EXCITED OSCILLATOR
Filed April 8, 1963
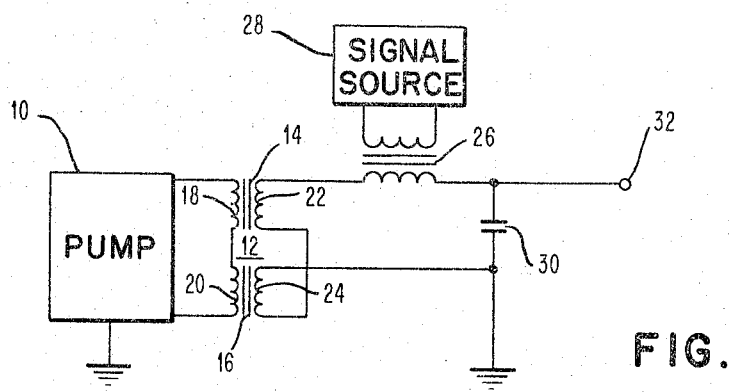
FIG. 1
FIG. 2
FIG. 3
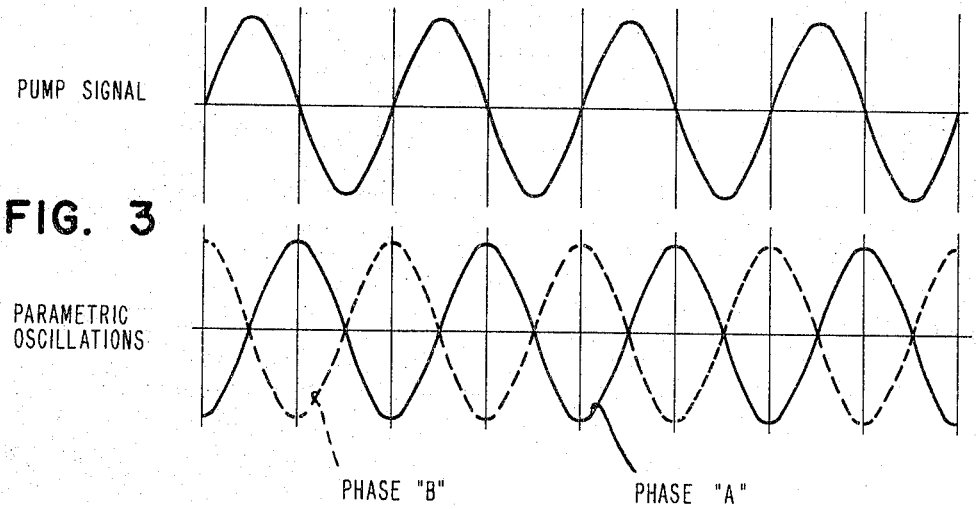
PUMP SIGNAL
PARAMETRIC OSCILLATIONS
PHASE "B"     PHASE "A"
*INVENTOR*
*DONALD T. BEST*
BY
*ATTORNEY*

United States Patent Office  3,327,129
Patented June 20, 1967

3,327,129
PARAMETRICALLY EXCITED OSCILLATOR
Donald T. Best, Plymouth Meeting, Pa., assignor to Sperry Rand Corporation, New York, N.Y., a corporation of Delaware
Filed Apr. 8, 1963, Ser. No. 271,290
5 Claims. (Cl. 307—88)

This invention relates to information handling devices, and more particularly to circuits having more than one stable state of operation.

In the electronic data processing field, numerous multistable state devices are utilized for such purposes as storing information, counting, and the like. A bistable device, for example, can store a "one" when it is in one of its stable states, and a "zero" when it is in its other stable state.

Parametric oscillators have, in the past, been used as bistable devices. In general, a parametric oscillator is a circuit or device having a reactance which is periodically varied so that oscillation occurs.

Parametric excitation can be defined as the achievement of power gain at one or more signal frequencies by means of a frequency transformation between one or more pump frequencies and the signal frequencies through the action of a medium with time varying characteristics.

By way of example, the oscillations may be sustained at a frequency equal to that of the pump signal frequency. Assume that the parameters of a tank circuit are adjusted in known fashion so that the natural or resonance frequency $f_o$ lies close to the pump frequency $f_p$. When the amplitude of the pump signal exceeds a critical value, the tank circuit is driven into parametric oscillation at a frequency $f_{osc}=f_p$, which is nearly equal to $f_o$ because of the action of the pump signal on the variable reactance element. Two possible stable phase outputs may be obtained from the oscillator. These outputs are of equal amplitude but differ in phase by 180°. Which output is obtained is determined by conditions existing in the tank circuit at the time oscillations commence. The circuit can be steered into one phase or the other by applying to the circuit a small signal of frequency $f_p$ at the desired phase during the time oscillations are starting to build up. This signal is commonly referred to as a "locking signal." The oscillations lock in at that one of the possible stable phases which is closest to the phase of the locking signal.

The prior art of parametric oscillators includes a device known as the "parametron." The parametron includes a pair of cores in which a pump source having a D.C. bias and an alternating current at frequency $f_p$ is coupled thereto by means of pump windings. Output windings of the cores are connected in an opposing manner to cancel induced voltages at the pump frequency. A capacitor is coupled across the output windings of desired value so that the output circuit is tuned to $f_p/2$. Such a circuit oscillates in either of two stable phases as described heretofore. Usually, the pump source is clocked so that it is alternately turned on and off. When the pump source is off, the circuit does not oscillate.

It is desirable in information handling systems that the systems operate at high speeds and that the circuitry be reliable, inexpensive and easy to manufacture. It is also desirable that the circuits be miniaturized so that the overall size and weight of a system be kept to a minimum. It is further desirable that the D.C. bias be eliminated, thereby eliminating the need for a D.C. bias supply and eliminating undesired interactions between the A.C. pump and D.C. bias. The present invention provides a circuit having more than one stable state and is capable of operation at extremely high frequencies, and, hence, at very high speeds.

It is an object of this invention to provide an improved multistable state circuit.

It is another object of this invention to provide a novel parametrically excited amplifier.

Yet another object of this invention is to provide a novel parametrically excited circuit wherein the output circuit oscillates at the same frequency as the pump source.

Still another object of this invention is to provide a novel oscillator which can oscillate in either of two different stable phases, each phase being distinct and different from the phase of the pump source.

According to one embodiment of the present invention, a magnetically saturable means has a pump winding and a pair of output windings coupled thereto. A pump source, which provides an alternating current at frequency $f_p$, is periodically applied to the pump winding (i.e. "clocked"). The output windings, which are coupled together in an opposed manner, have a capacitor across their terminals so that the "natural" frequency of the output circuit, when tuned, is the frequency $f_o=f_p$. A signal source at the same frequency $f_p$, at the desired phase, is coupled to the output circuit to control the phase of the oscillations in the output circuit, at one of the two stable phases.

The novel features of this invention and other objects and advantages thereof, together with its organization and method of operation, will become more apparent from the following description, when read in connection with the accompanying drawings, in which:

FIGURE 1 is a schematic of one embodiment of this invention;

FIGURE 2 is a waveform of the current produced by a pump source with relation to time, in accordance with one embodiment of this invention; and FIGURE 3 is a waveform of the two different stable phase states possible in the output circuit, one phase being shown in solid lines, the other in dotted form, the waveform being illustrated with the same time scale as shown in FIGURE 2.

Referring to FIGURE 1, there is shown magnetically saturable means 12 including a first transformer 14 and a second transformer 16. A pump source 10 is serially coupled to primary windings 18 and 20 of the transformers 14 and 16, respectively. The pump source 10 includes an A.C. supply having a frequency $f_p$ with an absence of D.C. bias. A pair of output windings 22, 24 of the transformers 14, 16, respectively, are coupled together in an opposed manner so as to cancel voltages induced therein by action of the current flowing in the primary windings 18, 20. The output windings 22, 24 have a capacitor 30 across their terminals, so that the resonance frequency of the output circuit is $f_p$. A suitable load (not shown) is coupled across the capacitor 30 at the output terminal 32. A small signal source 28 can be coupled by suitable means, as by a transformer 26, to the output tuned circuit 22–24–30.

The inductance of the output windings 22, 24 is dependent upon the state of magnetization of the transformers 14, 16. When the pump signal is at its peak, the transformers 14, 16 are saturated so that the inductance of the output windings are at a minimum, approaching air inductance. The inductance reaches its maximum at each zero of pump current.

Parametric oscillations can take place in one of two different phases, as shown in FIGURE 3. The output voltage present at the terminal 32 can be either at phase A or phase B, and, once in phase, remains locked in phase unless otherwise changed as set forth hereinafter. As set forth heretofore, the desired phase is obtained by inducing a "locking" signal into the circuit at the desired phase. The phase of the signal $f_o$ from the source 28, though relatively small in amplitude, determines what the phase of the output signal will be.

Oscillations take place in the output circuit in a stable manner. When it is desired to turn off the oscillations to place the device in its stable non-oscillating mode, the pump source is terminated, thereby terminating the excitation of the tank circuit.

The device described has three stable states: non-oscillation (when not excited by the pump), oscillation in phase A, and oscillation in phase B. The circuit can be switched from non-oscillation to oscillation in phase A by applying a small signal at phase A to the output circuit simultaneously with the application of the pump current to the transformers 14–16. The circuit can be switched from non-oscillation to oscillation in phase B by applying a small signal of phase B to the output circuit together with the pump current to the transformers 14–16. The small signal supplied by the signal source 28 need not be continuous, but may be a temporary signal, the device will continue oscillating though the signal source 28 be removed. The circuit can be switched, as set forth above, from oscillation to non-oscillation by termination of the pump source.

The circuit can be switched from one stable oscillating state to the other stable oscillating state by first terminating the pump source and subsequently re-applying the pump source to the pump windings 18–20 in coincidence with a small signal of the desired phase to the signal transformer 26.

The following is a typical example of one embodiment of this invention:

The magnetically saturable means 12 can include transformers having film "cores" produced by electroplating onto a substrate of glass in a solution of nickel-iron sulfates at room temperature, pH 2.2, $\bar{J}=6$ ma./cm.$^2$, in a magnetic field of 30 oe., the films being 1000 A. in thickness with an area of 3.14 cm.$^2$, $H_c=2.5$ oe. and $H_k=4.5$ oe.

The pump source 10 has a frequency of $10^8$ c.p.s. with a peak to peak field of 15 oersteds.

The pump winding 18, 20 are each 30 turns of No. 28 wire.

The control winding 26 includes a cube coil developing 7 oe./amp.

The output windings 22–24 have 40 turns each of No. 32 wire with an inductance of approximately $5\mu$h.

The capacitor 30 is tuned to resonance at the pump frequency.

The signal 28 is $5 \times 10^{-3}$ volts $10^8$ c.p.s.

Other modifications and variations will become obvious to those skilled in the art. The magnetically saturable means can include transformers, ferrite cores, multi-aperture cores, and thin films of both the flat and tubular types. Although two transformers are illustrated in FIGURE 1, it is apparent that one transformer, with one pump winding and two opposed output windings, constitute an equivalent circuit.

The embodiments of the invention in which an exclusive property or privilege is claimed are defined as follows:

1. In combination, transformer means including primary winding means, means exciting said primary winding means consisting of an alternating current pump source of frequency $f$, and secondary winding means including a pair of windings, said pair of windings being coupled together in a manner to cancel voltages induced therein by action of voltage changes in said primary winding means; and a capacitor coupled across said secondary winding means, the value of said capacitor and the inductance of said secondary winding means forming a tuned circuit resonant at the frequency $f$.

2. In combination, magnetically saturable means including primary winding means, means consisting of an alternating current pump signal of frequency $f$ coupled to said primary winding means for exciting said saturable means, and a pair of output windings coupled to each other in an opposed manner, and a capacitor coupled across said output windings, said capacitor having a valve so as to form with the inductance of said output windings a tuned circuit resonant at said frequency $f$.

3. In combination, magnetically saturable means including primary winding means, means consisting of an alternating current pump signal of frequency $f$ coupled to said primary winding means for exciting said saturable means, and a pair of output windings coupled to each other in an opposed manner, a capacitor coupled across said output windings, said capacitor having a value so as to form with the inductance of said output windings a tuned circuit resonant at said frequency $f$, and means for inducing a controlled phase oscillation to said tuned circuit.

4. In combination, magnetically saturable means including primary winding means, means consisting of a clockable alternatng current source of frequency $f$ and reference phase O coupled to said primary winding means for exciting said saturable means, said saturable means further including a pair of output windings coupled together in a manner to cancel out signals induced therein by action of the said primary winding means, a capacitor coupled to said output windings to form a tuned circuit resonant at said frequency $f$, and a signal source coupled to said tuned circuit and adapted to induce in said tuned circuit a signal at said frequency $f$ at a phase $\pi/2$ displaced from said reference phase.

5. In combination, a tuned circuit resonant at a frequency $f$ and having a variable reactance, means consisting of a clockable pump source providing an alternating pump signal at said frequency $f$ at a reference phase O coupled to said tuned circuit, and a signal control circuit coupled to said tuned circuit, said control circuit being operative to selectively apply to said tuned circuit a control signal of frequency $f$ at a phase $\pm\pi/2$ relative to said reference phase whereby said tuned circuit is adapted to parametrically oscillate at said frequency $f$ at a phase $\pm\pi/2$ with respect to said reference phase.

References Cited

UNITED STATES PATENTS

| 2,948,818 | 8/1960 | Goto | 307—88 |
| 3,119,024 | 1/1964 | Endo | 307—88 |
| 3,284,635 | 11/1966 | Eckert et al. | 307—88 |

BERNARD KONICK, *Primary Examiner.*

S. M. URYNOWICZ, *Assistant Examiner.*